United States Patent [19]

Best

[11] 4,330,908
[45] May 25, 1982

[54] HAIRPIN-TYPE ELECTRIC RESISTANCE HEATING ELEMENT MAKING

[75] Inventor: Albert B. Best, Danbury, Conn.

[73] Assignee: The Kanthal Corporation, Bethel, Conn.

[21] Appl. No.: 206,646

[22] Filed: Nov. 13, 1980

Related U.S. Application Data

[62] Division of Ser. No. 66,683, Aug. 15, 1979, Pat. No. 4,266,119.

[51] Int. Cl.³ .............................................. H05B 3/00
[52] U.S. Cl. ........................................ 29/611; 29/855; 29/860
[58] Field of Search ................ 29/611, 854, 855, 856, 29/860; 219/56-58, 267, 270, 541, 104, 106, 107, 118; 361/364-366; 13/25; 338/315, 326, 329, 332

[56] References Cited

U.S. PATENT DOCUMENTS

| | | |
|---|---|---|
| 2,993,111 | 7/1961 | Schrewclius ........................ 219/118 |
| 2,996,418 | 8/1961 | Bleil ..................................... 13/25 X |
| 3,139,558 | 6/1964 | Lindberg ............................. 361/266 |
| 3,166,665 | 1/1965 | Newkom et al. ................... 219/104 |
| 3,472,996 | 10/1969 | Braid et al. ......................... 219/104 |
| 3,496,326 | 2/1970 | Melley et al. ....................... 219/104 |
| 3,522,574 | 8/1970 | Giler ................................... 338/216 |
| 3,596,787 | 3/1971 | Palmer ............................. 219/270 X |
| 3,774,077 | 11/1973 | Raffaelli et al. ................ 361/266 X |
| 3,969,696 | 7/1976 | Wolfe et al. ........................ 338/315 |
| 3,980,859 | 9/1976 | Leonard .............................. 219/104 |
| 4,003,014 | 1/1977 | Branson et al. .................... 338/326 |
| 4,021,770 | 5/1977 | Buzzarri ............................. 338/332 |

Primary Examiner—Leon Gilden
Attorney, Agent, or Firm—Kenyon & Kenyon

[57] ABSTRACT

An electric resistance heating element of the hairpin type is provided by a molybdenum disilicide resistance wire loop transversely connected to molybdenum disilicide terminals. The resistance wire is sandwiched between the ends of two pieces of terminal wire and the ends of these pieces are butt welded together on the resistance wire, to form each terminal.

2 Claims, 6 Drawing Figures

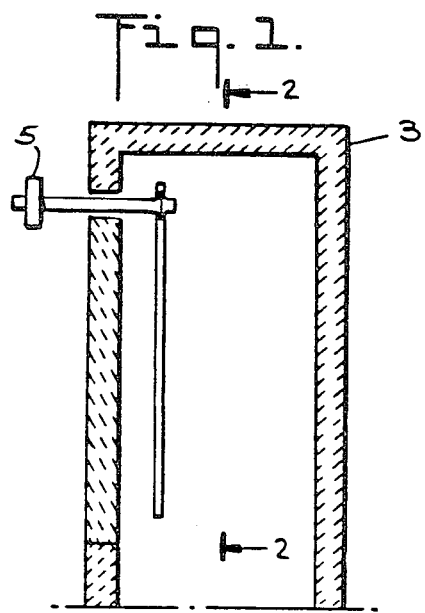
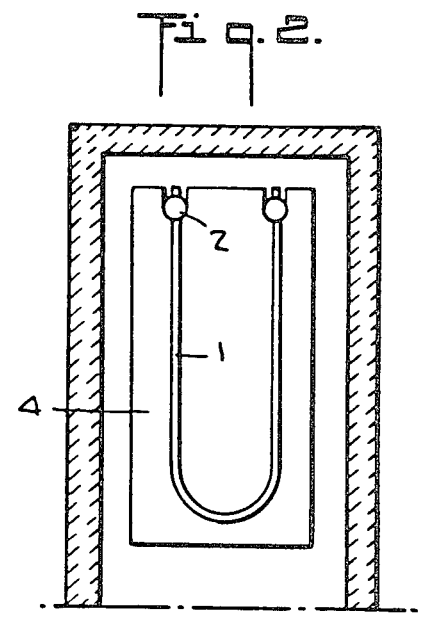
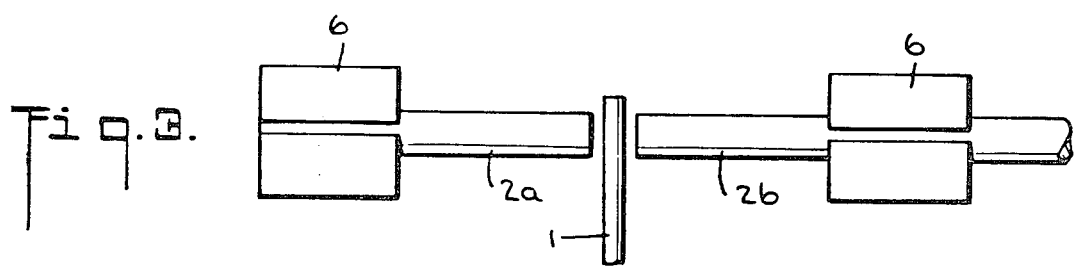
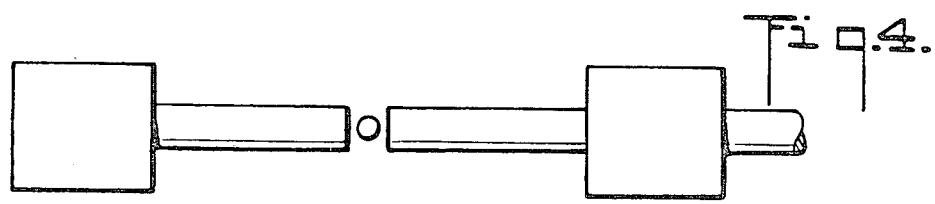
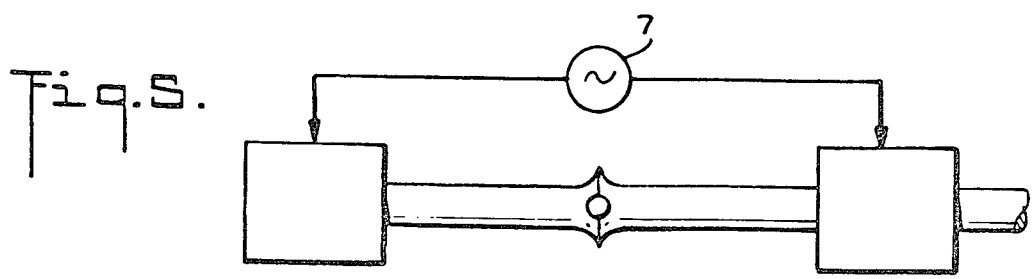
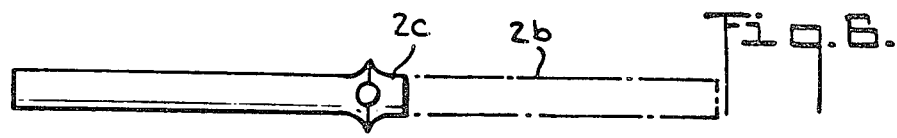

HAIRPIN-TYPE ELECTRIC RESISTANCE HEATING ELEMENT MAKING

This is a division, of application Ser. No. 66,683 filed Aug. 15, 1979 now U.S. Pat. No. 4,266,119.

BACKGROUND OF THE INVENTION

Electric resistance heating elements made of molybdenum disilicide are conventionally made in the form of an elongated loop of U-shape, of molybdenum disilicide resistance wire having legs to the ends of which molybdenum disilicide terminals are butt welded. They are commonly called hairpin elements.

The terminals are in the form of molybdenum disilicide wire and are made substantially larger in diameter than the resistance wire to reduce terminal heating when the element is in service. Electric resistance butt welding is used to weld the terminal wire ends to the resistance wire ends and this requires tapering of the terminal ends to provide ends having a diameter substantially the same as that of the resistance wire so that the butt welding is facilitated. The terminals are made long enough to accommodate their clamping by clamps which apply the electric power to the element.

Molybdenum disilicide is extremely hard, and to taper the terminal ends, requires the use of abrasive grinding techniques. The material is also brittle and this grinding is not only inherently expensive, but also involves the risk of terminal breakage.

The terminals are welded in axial alignment with the hairpin wire legs, and the terminals are vertical when clamped under service conditions so that the hairpin or loop of resistance wire depends vertically to avoid sagging problems when the element is in operation. However, for some applications it is desirable to mount the terminals horizontally with the loop of resistance wire depending, but this necessitates right angular bending of the terminal wire, because it has heretofore been impossible to weld the resistance wire right-angularly to the larger terminal wire.

The use of bent terminals requires an undesirable extent of terminal wire in the furnace using the element.

Molybdenum disilicide electric resistance wire is sold in a wide range of diameters under the trademark "KANTHAL SUPER".

DESCRIPTION OF THE INVENTION

This invention is a new heating element of the described type. The molybdenum disilicide resistance wire is angularly, such as right angularly, welded to the molybdenum disilicide terminal wire by being sandwiched between the ends of two separate pieces of the terminal wire with the ends of these pieces butt welded together with the resistance wire welded therebetween. The two pieces can be of the same cross-sectional area so that butt welding becomes possible.

The butt welding can be by the usual electric resistance butt welding method. To make this practice possible, for each terminal connection two terminal wires of substantially the same cross-sectional area, or diameter, are used, the resistance wire of small cross-sectional area, or diameter, being transversely positioned between the terminal wire ends. When desired, the transverse arrangement may be right angular. Ordinarily the terminal wires have the same contour throughout their lengths, and are cylindrical. Neither of the terminal wires need be ground to taper them to provide a cross-sectional area corresponding to that of the resistance wire, so the problems connected with grinding molybdenum disilicide are eliminated.

The orientation of the resistance wire relative to the terminal wires is inherently a transverse relationship which can be right angular, without bending of either wire. When the finished element is put in service, the terminal wires can be horizontally positioned by terminal clamps which both mount and power the element, with the resistance wire loop or hairpin depending vertically.

For the butt welding, with the resistance wire sandwiched, or positioned, between the ends of the two terminal wires, which should be axially aligned with each other, both of the two terminal wires can be easily clamped by a butt-welding machine's clamps, because they may be made relatively long for easy engagement by any conventional butt-welding machine's clamps which in this case as usual serve to both push the wire ends together and conduct the electric power required for the heating and butt welding of the two molybdenum disilicide terminal wires. One terminal wire can be given the length required by the finished terminal for easy operational clamping and mounting of the element, and the other terminal can be of any length providing it is long enough for clamping by the butt-welding clamp. After welding, the last-mentioned terminal wire can be cut very close to the butt weld so that it is left as only a short stud. The last-mentioned wire could be very short or in the form of a molded and sintered button, if backed-up by a carbon rod clamped by the welding machine clamp and removed after the welding. Then the cutting would be eliminated.

The wire used for the foregoing can be selected from commercially available round molybdenum disilicide wire which is necessarily straight because its brittleness prevents bending when cold. The wire material could be other refractory metal silicides if such becomes available.

BRIEF DESCRIPTION OF THE DRAWINGS

The accompanying drawings are only to illustrate in a schematic way the principles of this invention, the various figures being as follows:

FIG. 1 is a vertical section of a small or miniature furnace such as might be used by a dentist when making gold inlays;

FIG. 2 is a cross section taken on the line II—II in FIG. 1;

FIG. 3 shows the two pieces of terminal wire positioned end-to-end with the resistance wire positioned between, this being a side elevation;

FIG. 4 is the same as FIG. 3 but is a top view;

FIG. 5 is like FIG. 4 but illustrates the butt welding operation; and

FIG. 6 shows the finished result while illustrating that the excess length of the one terminal wire may be cut off.

DETAILED DESCRIPTION OF THE INVENTION

The small or miniature furnace illustrated by FIGS. 1 and 2 to exemplify the principles of this invention is a type that has heretofore been made necessarily with openings in its roof or top for passage of the usual terminals of a hairpin element, having the terminals in axial alignment with the legs of the resistance wire loop or hairpin and with the terminal ends tapered and butt welded to the resistance wire ends as previously described, all the parts made of molybdenum disilicide. This is a disadvantage because upward heat loss is involved.

Using the present invention, the molybdenum disilicide resistance wire loop 1 depends as usual but the butt welded molybdenum disilicide terminals 2 extend horizontally. This permits the top of the furnace enclosure 3 to be completely closed and a permanent part of the enclosure. For replacement of the element when necessary, a side door 4 is provided the furnace enclosure, permitting lateral or transverse removal and replacement of elements. Side openings provide for passage of the terminal 2 to terminal clamps 5 on the outside of the enclosure. This arrangement of furnace and element parts can be obtained when using the prior art end-to-end terminal-to-resistance wire arrangement only by making right angular bends in the terminal wire.

When making each terminal arrangement of the present invention, FIGS. 3 and 4 show how the resistance wire 1 has its upper end positioned between the two terminal wires 2a and 2b, each of which are clamped by the jaws 6 of an electric resistance butt-welding machine. For an example, and assuming a small furnace element, the resistance wire 1 may be round molybdenum disilicide wire having a diameter of 1.5 mm while both of the terminal wire parts 2a and 2b may be 3 mm diameter molybdenum disilicide wire. The wires can be cylindrical wires free from shaping and in the commercially obtainable form.

FIG. 5 shows the butt-welding operation in progress, the two jaws 6 being powered by suitable current as indicated at 7 and pushed together as indicated by the arrows so that the two ends of the terminal wire are butt welded together and about the terminal wire 1. The terminal wire itself can join in so that a welded mass is obtained, the two terminal wire ends upsetting as indicated in exaggerated form in FIG. 5.

During this butt welding operation, the two terminal wires 2a and 2b are, of course, axially aligned with each other, but neither need be shaped by a grinding operation as was required before. The resistance wire can depend right angularly from the terminal wires without bending of any of the wires. To emphasize that no terminal grinding operations are involved, it can be said that both wires are cylindrical throughout. Joint designs, however, can be applied to the larger diameter with a diamond saw.

Assuming the terminal wire length or piece 2a is to be the terminal, it can be provided with an appropriate length for use as indicated by FIGS. 1 and 2, for example. However, the other terminal part or piece 2b may be of any convenient length. Both 2a and 2b should be long enough for clamping by the clamp 6. FIG. 6 serves to illustrate how to finish each terminal, the wire 2b is cut by a diamond saw, for example, so as to leave only a very short piece 2c. This is in the form of a short stud only.

In the foregoing way, the electric resistance wire loop or hairpin 1 is provided with the right angle terminals 2 shown by FIGS. 1 and 2, with the attendant advantages previously noted.

Although the small or miniature furnace has been used to exemplify the present invention, the principles involved should not be understood as being limited with respect to size. Hairpin elements provided with right angular terminals may be applicable to large industrial furnaces using even the largest size of prior art molybdenum disilicide hairpin elements.

In any instance, the terminals and resistance wire loop need not necessarily be at right angles to each other.

What is claimed is:

1. A method for providing a refractory metal silicide resistance wire end with a refractory metal silicide terminal wire of larger diameter, said method comprising sandwiching the resistance wire end transversely between the ends of two pieces of said terminal wire with the resistance wire transversely positioned with respect to the terminal wires, and butt welding the two terminal ends together.

2. The method of claim 1 in which after said butt welding one of said terminal wires is cut from its balance, at a position close to the butt welded wires.

* * * * *